(12) United States Patent
Mase et al.

(10) Patent No.: US 10,073,209 B2
(45) Date of Patent: Sep. 11, 2018

(54) SURFACE-LIGHT SOURCE LIGHTING DEVICE

(71) Applicant: Panasonic Intellectual Property Management Co., Ltd., Osaka (JP)

(72) Inventors: Kenichiro Mase, Osaka (JP); Sadafumi Oota, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 17 days.

(21) Appl. No.: 15/327,655

(22) PCT Filed: Apr. 19, 2016

(86) PCT No.: PCT/JP2016/002079
§ 371 (c)(1),
(2) Date: Jan. 19, 2017

(87) PCT Pub. No.: WO2016/185667
PCT Pub. Date: Nov. 24, 2016

(65) Prior Publication Data

US 2017/0205557 A1    Jul. 20, 2017

(30) Foreign Application Priority Data

May 15, 2015  (JP) ................................ 2015-099560
Dec. 25, 2015  (JP) ................................ 2015-252705

(51) Int. Cl.
*F21V 8/00*  (2006.01)
*F21S 2/00*  (2016.01)

(52) U.S. Cl.
CPC .............. *G02B 6/0038* (2013.01); *F21S 2/00* (2013.01); *G02B 6/003* (2013.01); *G02B 6/005* (2013.01); *G02B 6/0055* (2013.01)

(58) Field of Classification Search
CPC .. G02B 6/0036; G02B 6/0016; G02B 6/0018; G02B 6/0038
See application file for complete search history.

(56) References Cited

U.S. PATENT DOCUMENTS 5,980,054 A    11/1999  Fukui et al.
7,360,939 B2    4/2008  Sugiura
(Continued)

FOREIGN PATENT DOCUMENTS

JP    2006-086075    3/2006
JP    2011-014520    1/2011
(Continued)

OTHER PUBLICATIONS

International Search Report of PCT application No. PCT/JP2016/002079 dated Aug. 2, 2016.
(Continued)

*Primary Examiner* — Andrew Coughlin
(74) *Attorney, Agent, or Firm* — Panasonic IP Management; Kerry S. Culpepper

(57) ABSTRACT

An object of the present disclosure is to provide a surface light source lighting device capable of realizing direction control and a stable operation with respect to vibration or a great temperature change, required for use in a backlight. This surface light source lighting device causes linear light incident from a light source (2a) to be incident to an edge surface (1L) of a light guide plate (1) via a light incidence portion (3a) including a light incidence lens and a louver, and can thus maintain high reliability with respect to vibration or a temperature change in a use environment. In the light guide plate (1), light reflected by a first light guide pattern (4A) provided on a rear surface thereof is reflected by a second light guide pattern (4B) provided on the same rear surface so that an emission direction is set, and thus (Continued)

light is emitted from a front surface of the light guide plate (1) with desired distribution characteristics.

7 Claims, 12 Drawing Sheets

(56) References Cited

U.S. PATENT DOCUMENTS

| | | | |
|---|---|---|---|
| 8,388,207 B2 | 3/2013 | Kurihara et al. | |
| 2002/0030984 A1* | 3/2002 | Ohkawa | G01D 11/28 362/625 |
| 2002/0030985 A1* | 3/2002 | Ohkawa | F21V 7/04 362/614 |
| 2002/0036729 A1* | 3/2002 | Ohkawa | G02B 6/0036 349/65 |
| 2002/0041349 A1* | 4/2002 | Ohkawa | G02B 6/0036 349/65 |
| 2002/0044233 A1* | 4/2002 | Ohkawa | G02B 6/0036 349/65 |
| 2002/0054488 A1* | 5/2002 | Ohkawa | G02B 6/0018 362/613 |
| 2002/0196388 A1* | 12/2002 | Ohkawa | G02B 6/0036 349/65 |
| 2003/0030764 A1* | 2/2003 | Lee | G02B 6/0036 349/65 |
| 2003/0137824 A1* | 7/2003 | Shinohara | G02B 6/0036 362/611 |
| 2005/0276566 A1* | 12/2005 | Iimura | G02B 6/0018 385/146 |
| 2006/0109686 A1 | 5/2006 | Sugiura | |
| 2009/0284985 A1 | 11/2009 | Bita et al. | |
| 2010/0142225 A1 | 6/2010 | Kurihara et al. | |
| 2013/0208502 A1 | 8/2013 | Nakayama | |

FOREIGN PATENT DOCUMENTS

| | | |
|---|---|---|
| JP | 2011-233416 | 11/2011 |
| JP | 2013-164921 | 8/2013 |
| WO | 2008/038754 A1 | 4/2008 |
| WO | 2013/081038 A1 | 6/2013 |

OTHER PUBLICATIONS

The Extended European Search Report dated May 4, 2018 for the related European Patent Application No. 16796064.0.

* cited by examiner

SURFACE-LIGHT SOURCE LIGHTING DEVICE

CROSS-REFERENCE TO RELATED APPLICATIONS

This application is a U.S. national stage application of the PCT International Application No. PCT/JP2016/002079 filed on Apr. 19, 2016, which claims the benefit of foreign priority of Japanese patent applications 2015-099560 filed on May 15, 2015 and 2015-252705 filed on Dec. 25, 2015, the contents all of which are incorporated herein by reference.

TECHNICAL FIELD

The present disclosure relates to a surface light source lighting device for a backlight source which is mainly used in on-vehicle liquid crystal displays or signage for outdoor and indoor exhibitions.

BACKGROUND ART

A backlight source using a light emitting diode (hereinafter, referred to as an "LED") has been recently widely used since the backlight source is greatly advantageous in terms of being thinner, more lightweight, and having higher efficiency than a light source using a cold cathode tube.

In order to implement a thinner light source, rather than a direct type in which an LED light source is disposed directly under a liquid crystal monitor or display, an edge light type is frequently used in which a light guide plate as a thin acryl plate or a polycarbonate plate having a rear surface on which minute patterns are formed is used, and light is emitted from a front surface of the light guide plate, that is, surface light emission occurs by causing light incident to an edge surface of the light guide plate.

In the edge light type, it is considered important that light radiated from a light source such as an LED chip is incident to the light guide plate, the light is controlled to be distributed in a desired direction, and thus light is uniformly emitted without causing a bright line or unevenness such as non-uniformity on the light guide plate. For this, if light is caused to be uniformly incident to the light guide plate, and a pattern of the light guide plate is appropriately disposed, light can be controlled to be distributed as desired without generating luminance unevenness or a dark line.

FIGS. 9A and 9B illustrate a configuration of a surface light source lighting device of the related art. In the surface light source lighting device of the related art, as illustrated in FIG. 9A, light from LEDs 32 is guided into light guide plate 34 from incidence edge surface 35 via light incidence lens 33, and the light travels to an opposite side while being reflected at planar portion 36 of a rear surface of light guide plate 34 as illustrated in FIG. 9B.

Light guide patterns 37 are formed on planar portion 36. Light guide plate 34 is made of a resin material such as acryl or polycarbonate, and thus causes total reflection at an incidence angle of about 41° or more due to a difference in a refractive index from air. Light reaches light guide pattern 37 in the middle of being guided inside light guide plate 34, the light is reflected toward a front surface of light guide plate 34 from light guide pattern 37, and thus light is emitted from that portion.

Such light guide patterns 37 are formed on the entire rear surface of light guide plate 34 with a specific pitch, and thus reflection occurs toward the front surface of light guide plate 34 at each location so that light is emitted from the entire front surface of light guide plate 34.

Light from LED 32 is generally radially generated. In a case where the light is incident to light guide plate 34 and reaches light guide pattern 37, the light is obliquely reflected toward the front surface of light guide plate 34 from light guide pattern 37 or obliquely reflected toward the rear surface of light guide plate 34 instead of being reflected toward the front surface of light guide plate 34, depending on an incidence angle, and thus light radiated from the surface light source lighting device is spread.

Thus, light incidence lens 33 which is designed to form substantially parallel light is inserted before light guide plate 34, and thus light close to parallel light is incident to light guide plate 34. Light incidence lens 33 is also formed in a plate shape by using a light transmissive material such as acryl or polycarbonate, and a plurality of light incidence lenses are arranged in parallel so as to form light incidence lens array 38. Light radiated from LEDs 32 is transmitted through respective light incidence lenses 33 so as to be converted into substantially parallel light, and is then incident to light guide plate 34 from incidence edge surface 35. Consequently, an amount of light which obliquely reaches light guide patterns 37 is reduced, and thus it is possible to control a direction of light toward the front surface of light guide plate 34.

CITATION LIST

Patent Literature

PTL 1: Japanese Patent Unexamined Publication No. 2011-233416

SUMMARY OF THE INVENTION

In a general consumer liquid crystal monitor or display, the maximum value of luminance is obtained in a front direction thereof, and emphasis is placed on uniformity when viewed from the front direction. In contrast, in an on-vehicle display, a direction of light is required to be controlled not only in the front direction but also in a specific direction according to a use application thereof. For example, in a display used instead of an analog display such as a speedometer, if light is emitted in an upper front direction, the light is reflected at a front window and enters a visual field. Therefore, a light blocking hood is necessary, and this lowers design nature. Thus, it is preferable that light is not emitted in an upper front direction, and is emitted in a lower front direction.

In a surface light source lighting device for outdoor or indoor exhibition digital signage, in a case where the lighting device is provided at a high position, it is required for luminance to be high in a lower front direction so that the lighting device is easily visible rather than to be high in a front direction.

In a case of an on-vehicle surface light source lighting device, there is a restriction in a size thereof, and there is also a great restriction in a configuration condition of the surface light source lighting device in terms of coping with vibration or a change in the use temperature environment.

In the surface light source lighting device illustrated in FIGS. 9A and 9B, there is a form in which light incidence lens 33 is inserted between LEDs 32 and light guide plate 34, and thus a distance increases by the width thereof. Consequently, a width of a bezel as a frame of a liquid crystal monitor or display increases, and thus the design nature is lowered, and the liquid crystal monitor or the display may not be mounted in a vehicle in a vehicular application due to the restriction in the size.

In the vehicular application, emphasis is placed on a vibration countermeasure. The influence of positional deviation due to vibration is small in a configuration of only LEDs 32 and light guide plate 34, but the influence of relative positional deviation due to light incidence lens 33 interposed therebetween increases.

In the vehicular application, a temperature environment is severe, and there is the requirement for a use environment of −30° C. or more and +85° C. or less. Thermal shrinking occurs at that time, and thus a relative positional deviation occurs due to a difference between thermal expansion coefficients of materials. Also in this case, the influence of the relative positional deviation due to light incidence lens 33 interposed between LEDs 32 and light guide plate 34 increases.

In order to solve the problems of the related art, an object of the present disclosure is to provide a surface light source lighting device which can control a light emission direction in a specific direction, required in an on-vehicle display or the like.

According to the present disclosure, there is provided a surface light source lighting device in which light is incident to an edge surface of a light guide plate from a light source so as to propagate through the light guide plate, and the light is emitted from a front surface of the front surface and a rear surface of the light guide plate, the device including a light source including a plurality of light source elements which are disposed with an interval in a longitudinal direction of the edge surface of the light guide plate. The surface light source lighting device further includes a first light guide pattern having a linear groove group in a first oblique direction with respect to a light incidence direction from the light source on the rear surface of the light guide plate to which light is incident from the light source; and a second light guide pattern having a linear groove group in a second oblique direction which is different from the first oblique direction of the first light guide pattern on the rear surface of the light guide plate. In the surface light source lighting device, light reflected by the first light guide pattern is reflected by the second light guide pattern, and is emitted from the front surface of the light guide plate.

According to the surface light source lighting device, light reflected by a first light guide pattern provided on a rear surface of the light guide plate can be reflected by a second light guide pattern provided on the same rear surface so that an emission direction is set, and thus light can be emitted from a front surface of the light guide plate with desired distribution characteristics.

DESCRIPTION OF EMBODIMENTS

Hereinafter, a surface light source lighting device according to each embodiment of the present disclosure will be described with reference to the drawings.

Embodiment 1

Figure 1A:
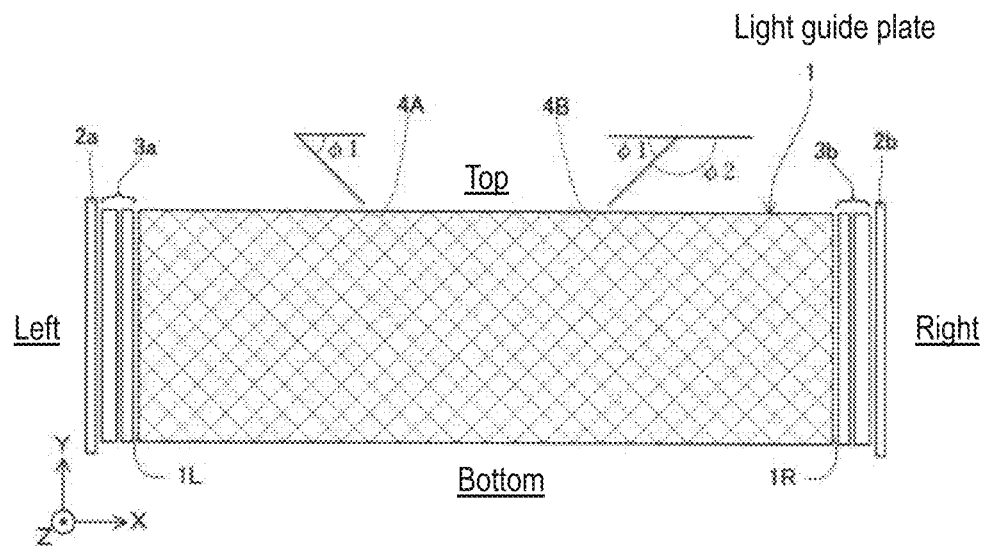
FIG. 1A is a front view of a surface light source lighting device according to Embodiment 1 of the present disclosure.
Figure 1B:
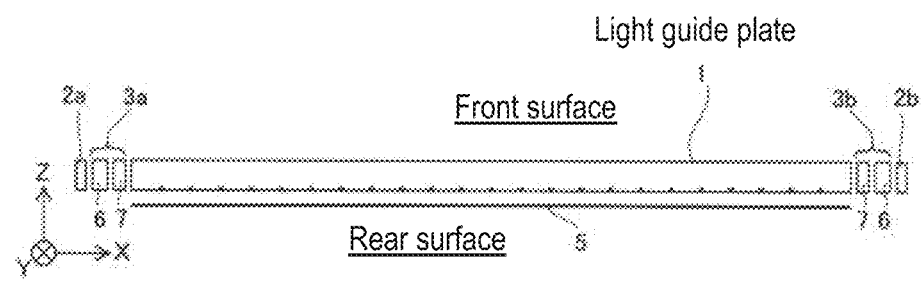
FIG. 1B is a bottom view of the surface light source lighting device according to Embodiment 1 of the present disclosure.
Figure 1C:
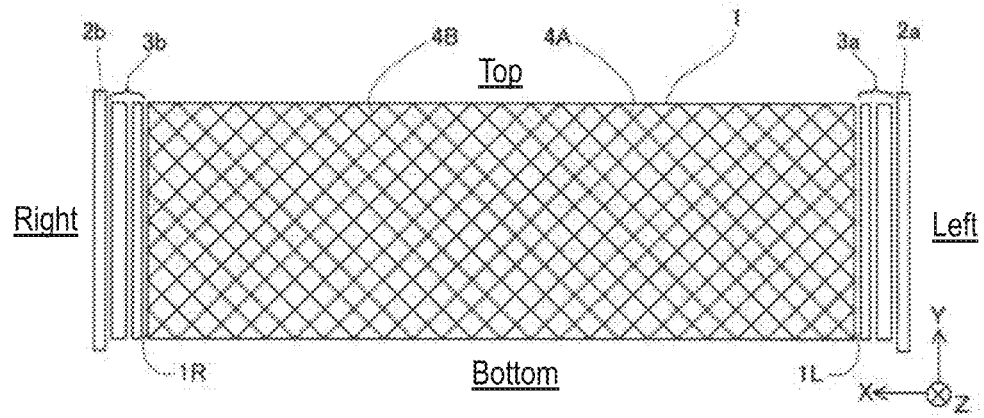
FIG. 1C is a rear view of the surface light source lighting device according to Embodiment 1 of the present disclosure.

FIGS. 1A, 1B and 1C illustrate a surface light source lighting device of the present disclosure. Specifically, FIG. 1A is a front view of the surface light source lighting device of the present disclosure, FIG. 1B is a bottom view of the surface light source lighting device, and FIG. 1C is a rear view of the surface light source lighting device.

The surface light source lighting device includes, as illustrated in FIG. 1A, plate-shaped light guide plate 1; light source 2a disposed on left edge surface 1L side of the light guide plate; light source 2b disposed on right edge surface 1R side of light guide plate 1; light incidence portion 3a interposed between light source 2a and edge surface 1L of light guide plate 1; and light incidence portion 3b interposed between light source 2b and edge surface 1R of light guide plate 1. X indicates a horizontal direction of light guide plate 1, Y indicates a vertical direction of light guide plate 1, and Z indicates a direction directed from a rear surface of light guide plate 1 toward a front surface thereof.

As a material of light guide plate 1, having 0.45 or more as a difference in a refractive index from air is used. For example, a material such as an acrylic resin or a polycarbonate resin may be used for light guide plate 1. As illustrated in FIGS. 1B and 1C, first light guide patterns 4A and second light guide patterns 4B formed of linear groove groups are formed on the rear surface of light guide plate 1. Each of first light guide patterns 4A and second light guide patterns 4B is a groove-shaped recess and is formed in a triangular edge shape on the rear surface of light guide plate 1.

Each of first light guide patterns 4A formed with a constant pitch is inclined by φ1 so that the other end thereof comes close to edge surface 1R of light guide plate 1 with an upper side or edge surface 1L of light guide plate 1 as one end thereof in FIG. 1A.

Each of second light guide patterns 4B formed with a constant pitch is inclined by φ2 so that the other end thereof comes close to edge surface 1L of light guide plate 1 with the upper side or edge surface 1R of light guide plate 1 as one end thereof in FIG. 1A.

Light generated by light source 2a and light source 2b passes through light incidence portion 3a and light incidence portion 3b so as to be incident to light guide plate 1, and thus the light is emitted from the front surface of light guide plate 1, that is, surface light emission occurs. Therefore, light guide plate 1 functions as a part of a backlight of, for example, an on-vehicle display.

As illustrated in FIG. 1B, rear surface sheet 5 is disposed on the rear surface of light guide plate 1. A light absorbing material is used for rear surface sheet 5 which restricts unnecessary light leaking to the rear surface of light guide plate 1 from returning to the front surface side of light guide plate 1. FIG. 1C does not illustrate rear surface sheet 5 in order to illustrate first light guide patterns 4A and second light guide patterns 4B.

Figure 2A:
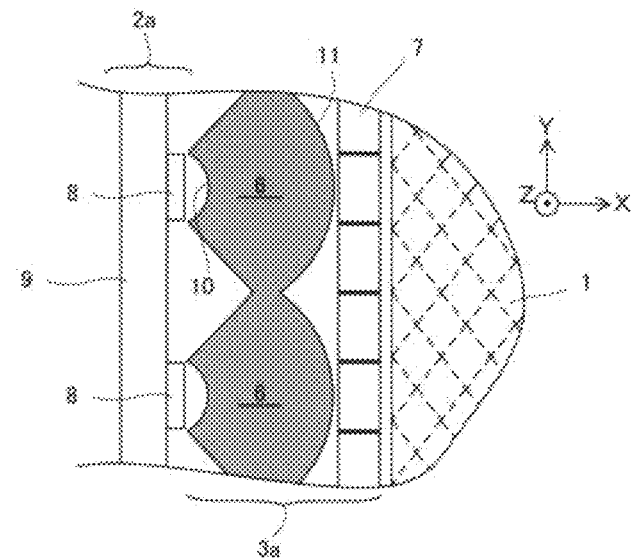
FIG. 2A is an enlarged plan view of a light incidence portion of the surface light source lighting device according to Embodiment 1 of the present disclosure.
Figure 2B:
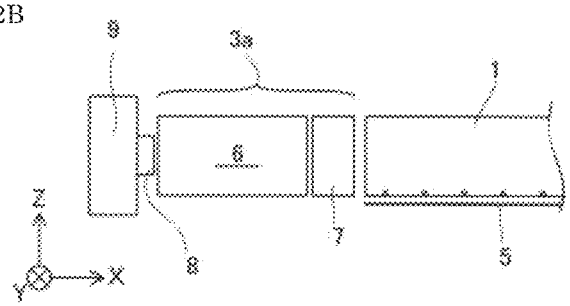
FIG. 2B is a side view of the light incidence portion of the surface light source lighting device according to Embodiment 1 of the present disclosure.

As illustrated in FIGS. 2A and 2B, each of light source 2a and light source 2b is formed of LED mounting board 9 on which a plurality of LEDs 8 are serially arranged. Each of light incidence portion 3a and light incidence portion 3b is formed of light incidence lens 6 and louver 7.

Here, light emitted from LEDs 8 is incident to light incidence lens 6. Curved shapes are formed on both of an LED side and a light guide plate side of light incidence lens 6. Light incidence lens 6 is formed in a so-called meniscus shape so that curved surface 10 on the LED side has a concave shape, and curved surface 11 on the light guide plate side has a convex shape. Curved surface 10 on the LED side having a concave shape has a function of causing light passing therethrough to be refracted and thus to be diffused in a wider manner than a radiation angle of the LED. In this case, the light is refracted by curved surface 11 on the light guide plate side having a convex shape so as to be incident to light guide plate 1 as substantially parallel light. Since light is spread and then is converted into substantially parallel light by using both surfaces of light incidence lens 6, it is possible to reduce unevenness of light and also to reduce a length in an optical axis direction of light incidence lens 6 from LEDs 8 to light guide plate 1.

In a lens of the related art, a length in an optical axis direction from LEDs 8 to light guide plate 1 is equal to or more than a pitch of LEDs 8, but, in the lens of the present embodiment, the length can be made smaller than a distance of the pitch of LEDs 8. If the length is equal to or more than the pitch of the LEDs, a size thereof increases, and, thus, in a case of a vehicular application, the lens is hardly employed due to a large mounting volume being taken. As an example, in a case where the pitch of LEDs 8 is 6 mm, the length in the optical axis direction to light guide plate 1 can be realized to be 5 mm or less. In other words, the length of light incidence lens 6 in the optical axis direction to light guide plate 1 is smaller than the pitch of LEDs 8.

On the other hand, since a direction of light is controlled with a short distance in light incidence lens 6, there is the occurrence of light whose direction is deviated and thus which is emitted in an oblique direction. Thus, louver 7 is provided between light incidence lens 6 and light guide plate 1. Unnecessary light which is obliquely deviated is absorbed by louver 7, and thus only light beams which are arranged to be substantially parallel are incident to light guide plate 1.

Figure 3:
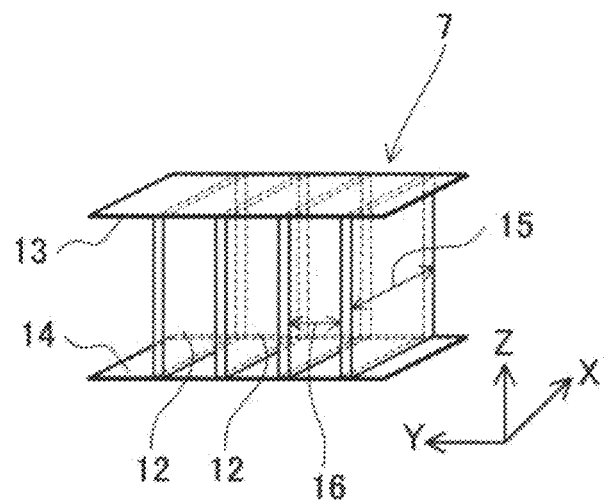
FIG. 3 is an enlarged perspective view of a louver of the surface light source lighting device according to Embodiment 1 of the present disclosure.

FIG. 3 illustrates louver 7.

Louver 7 has partition walls 12 which are disposed in a direction orthogonal to the front surface and the rear surface of light guide plate 1 with an interval in a longitudinal direction (Y direction) of light guide plate 1; front reflection surface 13 which closes edge surfaces of partition walls 12 on the front surface side; and rear reflection surface 14 which closes edge surfaces of partition walls 12 on the rear surface side. The inside of a region surrounded by two partition walls 12 and 12, front reflection surface 13, and rear reflection surface 14 is formed as an air layer or a resin layer. In a case of the air layer, front reflection surface 13 and rear reflection surface 14 cause mirror-surface reflection, and in a case where the inside of the region is filled with the resin layer, reflection occurs at an interface of a resin.

A black absorption material such as carbon is used for partition wall 12 which thus has a function of absorbing light when the light is incident thereto without reflecting the light. If louver width 16 is restricted relative to louver depth 15, light which has a large incidence angle in the surface of light guide plate 1 in the optical axis direction from LEDs 8 to light guide plate 1 is absorbed by partition walls 12. Therefore, only light which travels straight is output from louver 7, and can thus be controlled to enter light guide plate 1 as substantially parallel light.

A ratio of louver width 16 to louver depth 15 is 0.1 to 0.6. If the ratio is more than 0.6, an incidence angle exceeds 31°, and thus a direction of light cannot be controlled. If the ratio is less than 0.1, light is almost absorbed, and thus a necessary amount of light cannot be obtained. As an example, in a case where louver depth 15 is 1 mm, and louver width 16 is 0.5 mm, the ratio therebetween is 0.5.

In the above-described way, light, which is emitted from LEDs 8, converted into substantially parallel light as a result of being transmitted through light incidence lens 6 and louver 7, and incident to light guide plate 1, is guided to the opposite direction while repeating reflection at the front surface and the rear surface inside light guide plate 1. Light reaching first light guide patterns 4A and second light guide patterns 4B formed on the rear surface of light guide plate 1 is reflected toward the front surface side of light guide plate 1 through reflection.

Figure 9A:
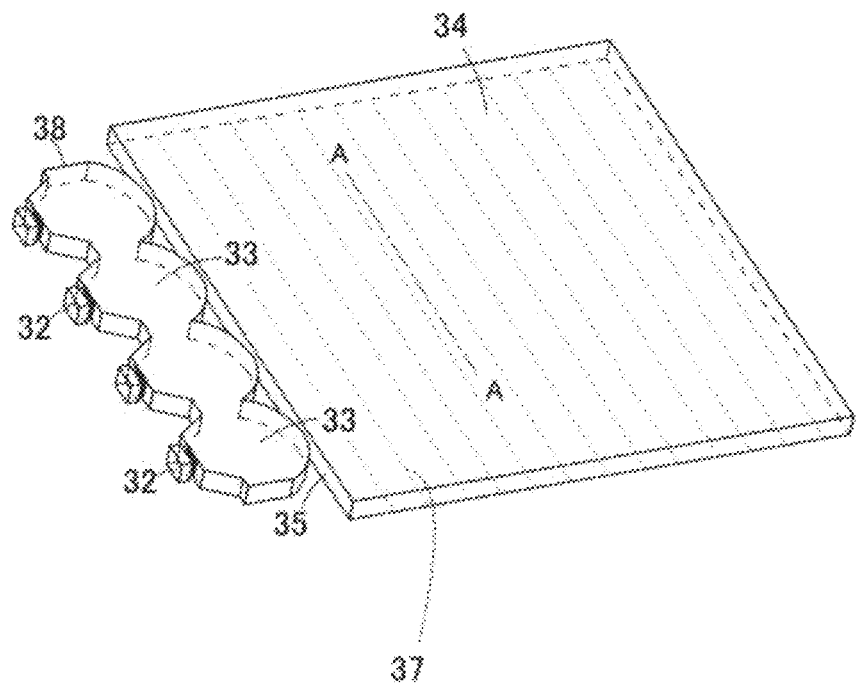
FIG. 9A is an exterior perspective view of a surface light source lighting device of the related art.
Figure 9B:
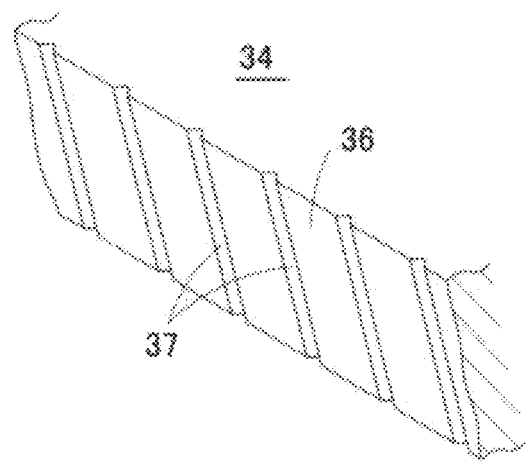
FIG. 9B is a perspective view of a bottom of the surface light source lighting device of the related art.

In a typical light guide plate, light guide patterns are set in an A-A direction orthogonal to an incidence direction of light to light guide plate 1 by 90° in a light guide plate surface as illustrated in FIG. 9A. On the other hand, in light guide plate 1 according to the present embodiment, as illustrated in FIGS. 1A, 1C and 4A, first light guide patterns 4A and second light guide patterns 4B are characterized in that the patterns are disposed to be inclined in oblique directions with respect to an incidence direction of light to light guide plate 1.

Figure 4A:
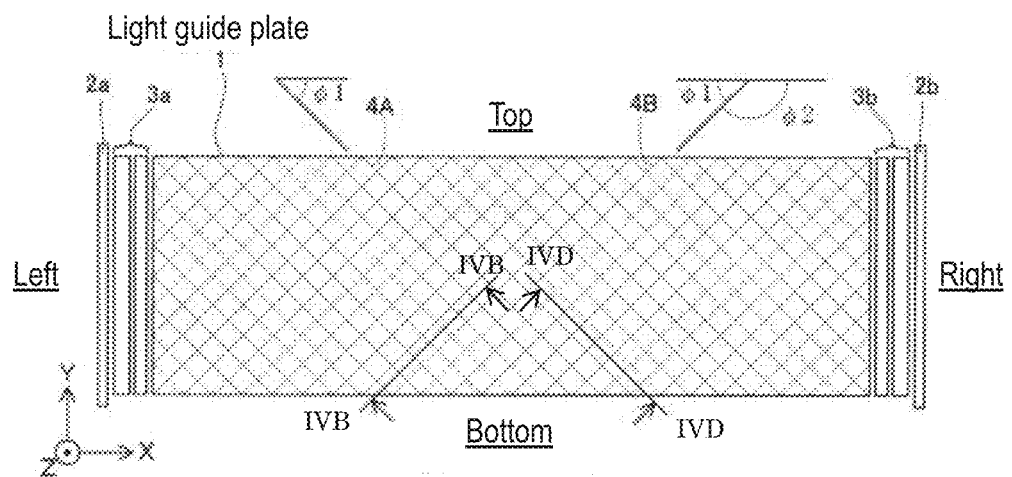
FIG. 4A is a front view of the surface light source lighting device according to Embodiment 1 of the present disclosure.
Figure 4B:
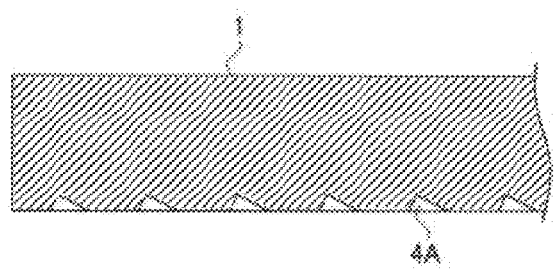
FIG. 4B is an enlarged sectional view taken along the line IVB-IVB in the surface light source lighting device according to Embodiment 1 of the present disclosure.

With reference to FIGS. 4A to 4E, first light guide patterns 4A and second light guide patterns 4B will be described in detail. FIG. 4B is a sectional view of first light guide patterns 4A taken along the line IVB-IVB in FIG. 4A. The light guide pattern angle $\phi 1$ of first light guide pattern 4A is set to an angle of 20° to 50° in a case where an incidence direction from light source 2a to light guide plate 1 is set to be 0°. Here, $\phi 1$ is set to 45°.

Figure 4C:
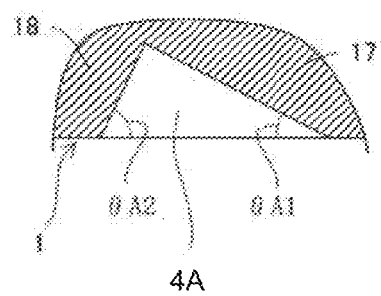
FIG. 4C is an enlarged sectional view of a first light guide pattern on a light guide plate rear surface in the surface light source lighting device of Embodiment 1 of the present disclosure.

FIG. 4C is an enlarged view of the first light guide pattern illustrated in FIG. 4B. First light guide pattern 4A is formed of principal prism reflection surface 17 having a base angle of $\theta A1$, and subsidiary prism reflection surface 18 having a base angle of $\theta A2$.

Figure 4D:
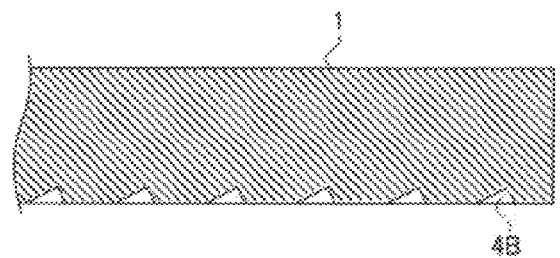
FIG. 4D is an enlarged sectional view taken along the line IVD-IVD in the surface light source lighting device according to Embodiment 1 of the present disclosure.

FIG. 4D is a sectional view of second light guide patterns 4B taken along the line IVD-IVD in FIG. 4A. Light guide pattern angle $\phi 2$ of second light guide pattern 4B is set to an angle of 20° to 50° in a case where an incidence direction from light source 2b to light guide plate 1 is set to be 0°. Here, $\phi 2$ is set to 45°.

Figure 4E:
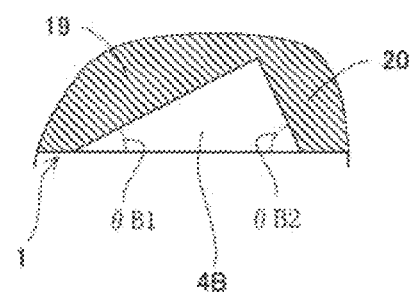
FIG. 4E is an enlarged sectional view of a second light guide pattern on the light guide plate rear surface in the surface light source lighting device of Embodiment 1 of the present disclosure.

FIG. 4E is an enlarged view of the second light guide pattern illustrated in FIG. 4D. Second light guide pattern 4B is formed of principal prism reflection surface 19 having a base angle of $\theta B1$, and subsidiary prism reflection surface 20 having a base angle of $\theta B2$.

In a case where light guide pattern angles $\phi 1$ and $\phi 2$ are less than 20°, light from light sources 2a and 2b scarcely arrives, and a necessary amount of light cannot be obtained. In a case where light guide pattern angles $\phi 1$ and $\phi 2$ are more than 50°, a distribution direction of light emitted from the front surface of light guide plate 1 in a lower direction cannot be controlled.

Some of light which is emitted from light source 2a and is incident to the inside of light guide plate 1 from left edge surface 1L of light guide plate 1 is reflected at an interface on the front surface side of light guide plate 1 or an interface on the rear surface side so as to propagate through light guide plate 1. The light is reflected at principal prism reflection surface 19 of second light guide pattern 4B, and is further reflected at the interface on the front surface side of light guide plate 1 so as to propagate through light guide plate 1. The light is reflected at subsidiary prism reflection surface 18 of first light guide pattern 4A so as to be emitted toward the front surface side of light guide plate 1.

Some of light which is emitted from light source 2b and is incident to the inside of light guide plate 1 from right edge surface 1R of light guide plate 1 is reflected at the interface on the front surface side of light guide plate 1 or the interface on the rear surface side so as to propagate through light guide plate 1. The light is reflected at principal prism reflection surface 17 of first light guide pattern 4A, and is further reflected at the interface on the front surface side of light guide plate 1 so as to propagate through light guide plate 1. The light is reflected at subsidiary prism reflection surface 20 of second light guide pattern 4B so as to be emitted toward the front surface side of light guide plate 1.

As mentioned above, light is mainly reflected at principal prism reflection surfaces 17 and 19, and thus angles $\theta A1$ and $\theta B1$ of the surfaces greatly contribute to direction control. Subsidiary prism reflection surfaces 18 and 20 achieve an effect of reversing a direction of light in the lower direction when light first reaches the surfaces.

Base angle $\theta A1$ and $\theta B1$ of principal prism reflection surfaces 17 and 19 are set to an angle of 30° to 50°. In a case where the base angle is less than 30°, light leakage occurs from the front surface of light guide plate 1 in the upper direction, and thus luminance is reduced. In a case where the base angle is more than 50°, light cannot be reflected from the front surface of light guide plate 1 in the obliquely lower direction, and thus leaks almost directly below.

Base angle $\theta A2$ and $\theta B2$ of subsidiary prism reflection surface 18 and 20 are set to an angle of 70° to 90°. In a case where the base angle is less than 70°, light leakage occurs from the front surface of light guide plate 1 in the upper direction, and thus luminance is reduced. In a case where the base angle is more than 90°, an inclined surface has an overhung form, and this cannot be processed.

Here, $\theta A1$ of principal prism reflection surface 17 is set to 32°, and $\theta A2$ of subsidiary prism reflection surface 18 is set to 72°.

Also in second light guide pattern 4B, light is mainly reflected at principal prism reflection surface 19, and angle $\theta B1$ of the surface greatly contributes to direction control. Inclined angle $\theta B1$ of the principal prism reflection surface gives an effect of reversing a direction of light in the lower direction when light first reaches the surface.

Base angle $\theta B1$ of principal prism reflection surface 19 is the same as base angle $\theta A1$ of principal prism reflection surface 17. Base angle $\theta B2$ of subsidiary prism reflection surface 20 is the same as base angle $\theta A2$ of subsidiary prism reflection surface 18. Here, $\theta B1$ of principal prism reflection surface 19 is set to 32°, and $\theta B2$ of subsidiary prism reflection surface 20 is set to 72°.

Figure 5A:
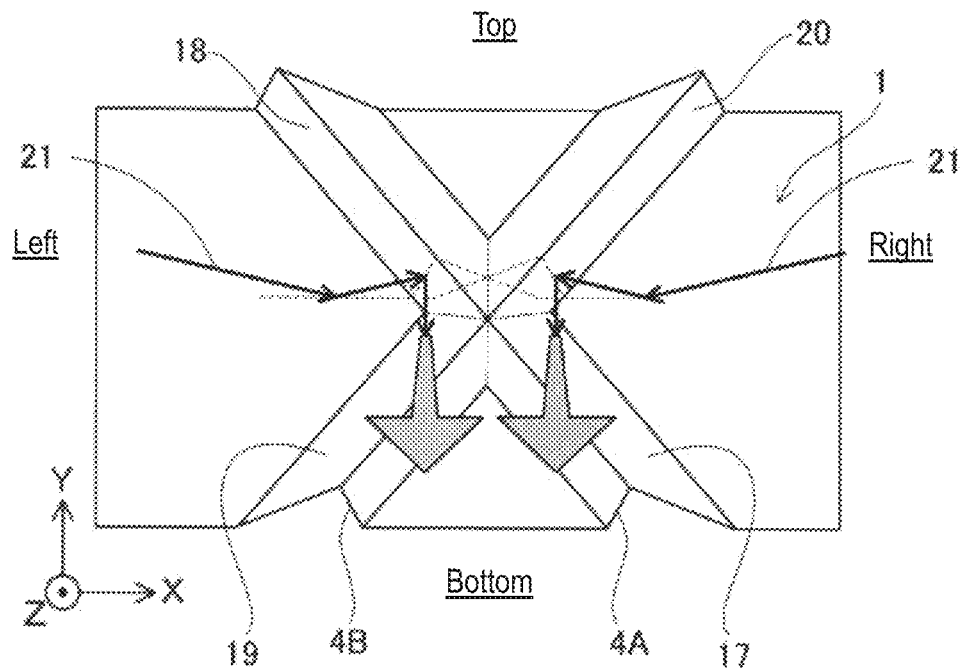
FIG. 5A is an enlarged perspective view for explaining a state in which light is reflected by the first and second light guide patterns in Embodiment 1 of the surface light source lighting device of the present disclosure.
Figure 5B:
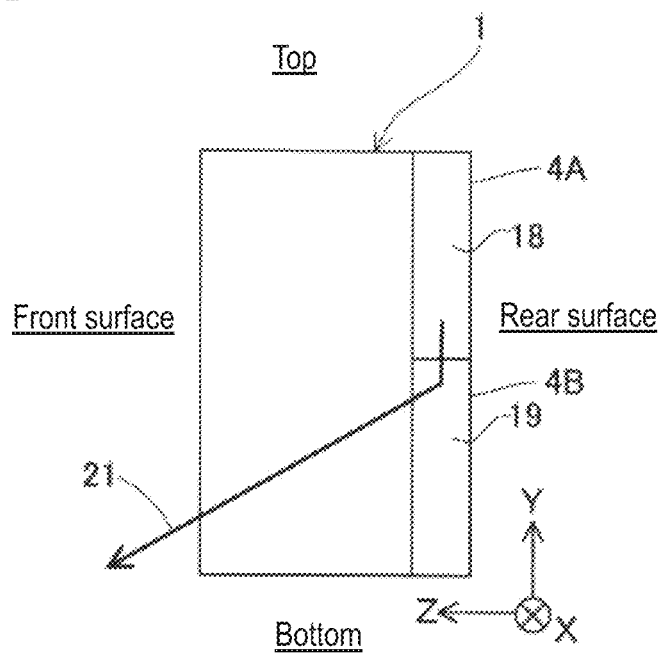
FIG. 5B is a side view for explaining a state in which light is reflected by the first and second light guide patterns in Embodiment 1 of the surface light source lighting device of the present disclosure.

As mentioned above, since first light guide patterns 4A and second light guide patterns 4B having different inclinations are formed on light guide plate 1, regarding light which is incident to light guide plate 1 from left light source 2a, as illustrated in FIG. 5A, light beam 21 which is guided along the inside of light guide plate 1 reaches subsidiary prism reflection surface 18 so as to be reflected in the lower direction in the light guide plate, and is then reflected with an angle of the inclination of principal prism reflection surface 19 thereat. As illustrated in FIG. 5B, reflected light beam 21 is subjected to direction control so as to be emitted from the front surface of light guide plate 1 in the obliquely lower direction.

Similarly, regarding light which is incident to light guide plate 1 from right light source 2b, as illustrated in FIG. 5A, light beam 21 which is guided along the inside of light guide plate 1 reaches subsidiary prism reflection surface 20 so as to be reflected in the lower direction in the light guide plate, and is then reflected with an angle of the inclination of principal prism reflection surface 17 thereat. Reflected light beam 21 is subjected to direction control so as to be emitted from the front surface of light guide plate 1 in the obliquely lower direction.

Figure 6:
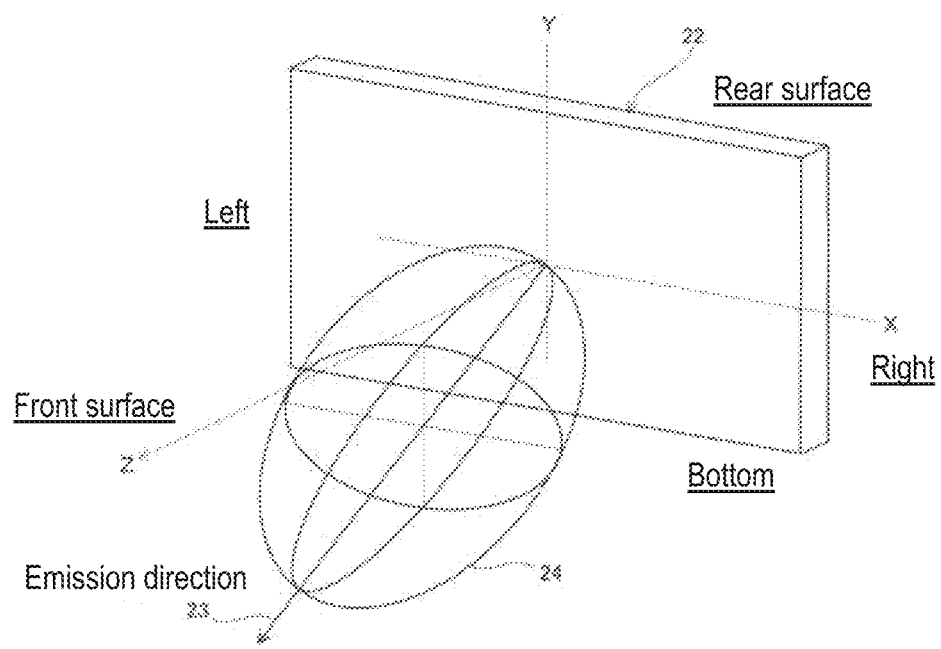
FIG. 6 is a perspective view for explaining a distribution of light emitted from the light guide plate and a light emission direction in Embodiment 1 of the surface light source lighting device of the present disclosure.

FIG. 6 illustrates distribution 24 of light whose emission direction 23 can be controlled in the lower front direction by using first light guide patterns 4A and second light guide patterns 4B in the above-described way. Surface light source lighting device 22 integrates light guide plate 1, light source 2a, light source 2b, light incidence portion 3a, and light incidence portion 3b.

Figure 7A:
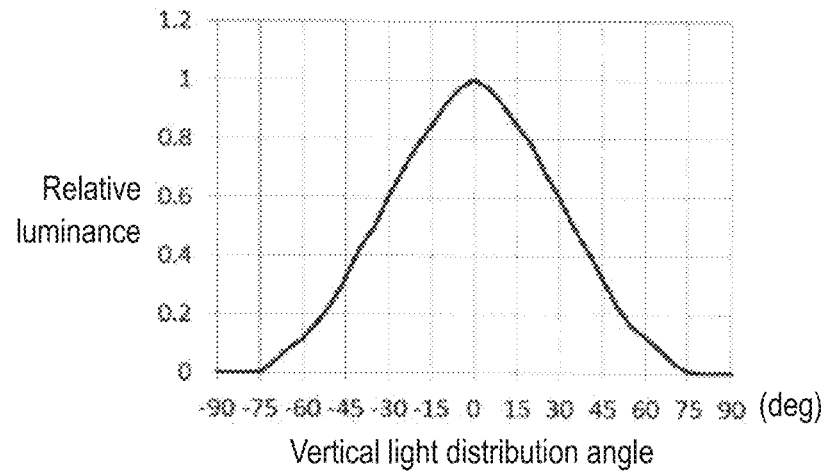
FIG. 7A is a diagram illustrating vertical distribution characteristics of luminance of light emitted from a light guide plate of a surface light source lighting device of the related art.

FIG. 7A is a diagram illustrating vertical distribution characteristics of luminance in a surface light source lighting device of the related art as a comparative example. A transverse axis expresses an emission angle, in which 0° indicates the front side, −90° indicates a directly upper side, and +90° indicates a directly lower side. A longitudinal axis expresses a value relative to a peak value of luminance. In this comparative example, since a light emission direction is not controlled, the luminance is widely distributed in a state in which the front side of a light guide plate shows a peak, and light is also strongly emitted in the vertical direction.

Figure 7B:
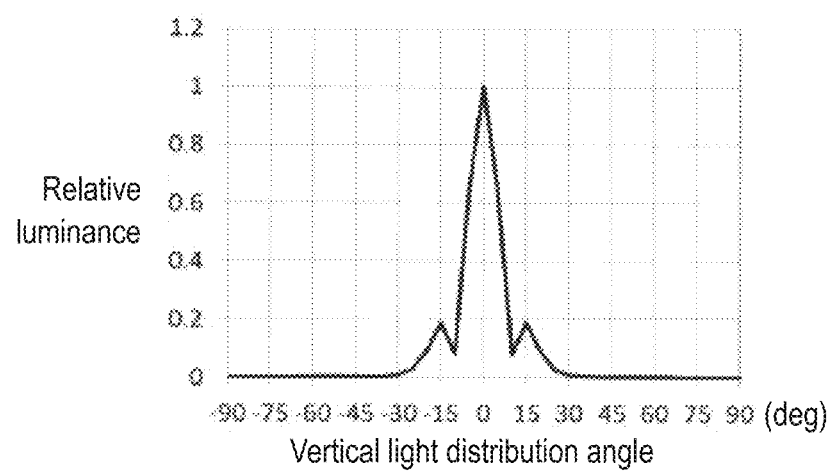
FIG. 7B is a diagram illustrating vertical distribution characteristics of luminance of light emitted from the light guide plate of the surface light source lighting device of Embodiment 1 of the present disclosure.
Figure 7C:
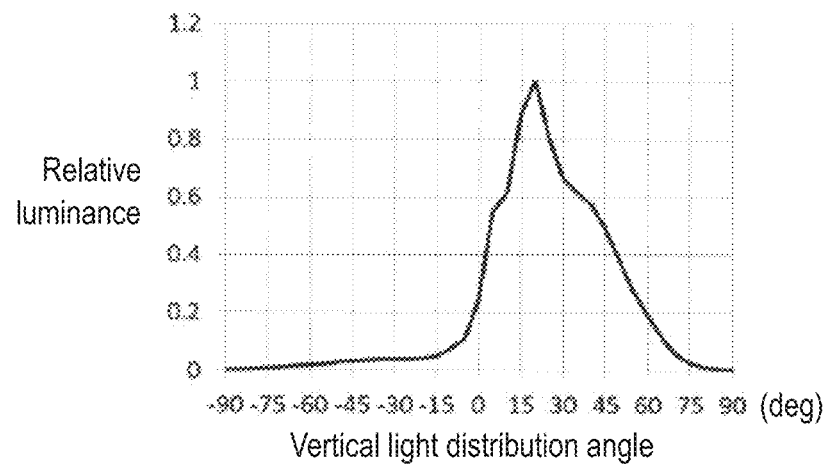
FIG. 7C is a diagram illustrating vertical distribution characteristics of luminance of a light emitted from the light guide plate in a case where a setting of the light guide pattern is changed in the surface light source lighting device of Embodiment 1 of the present disclosure.

In contrast, FIGS. 7B and 7C illustrate vertical distribution characteristics of luminance in the surface light source lighting device of Embodiment 1. Since light incidence portion 3a and light incidence portion 3b are provided, a direction in which light is emitted is narrowed centering on the front side as illustrated in FIG. 7B, and thus it is possible to realize a luminance pattern in which light is emitted toward only the front side in a concentrated manner. By setting appropriate angles φ1, φ2, θA1, θA2, θB1 and θB2 of first light guide pattern 4A and second light guide pattern 4B, as illustrated in FIG. 7C, it is possible to narrow a direction of emitted light and to control the direction in the obliquely lower direction, and thus there are characteristics that there is scarcely any unnecessary light emitted toward the upper side.

Figure 8A:
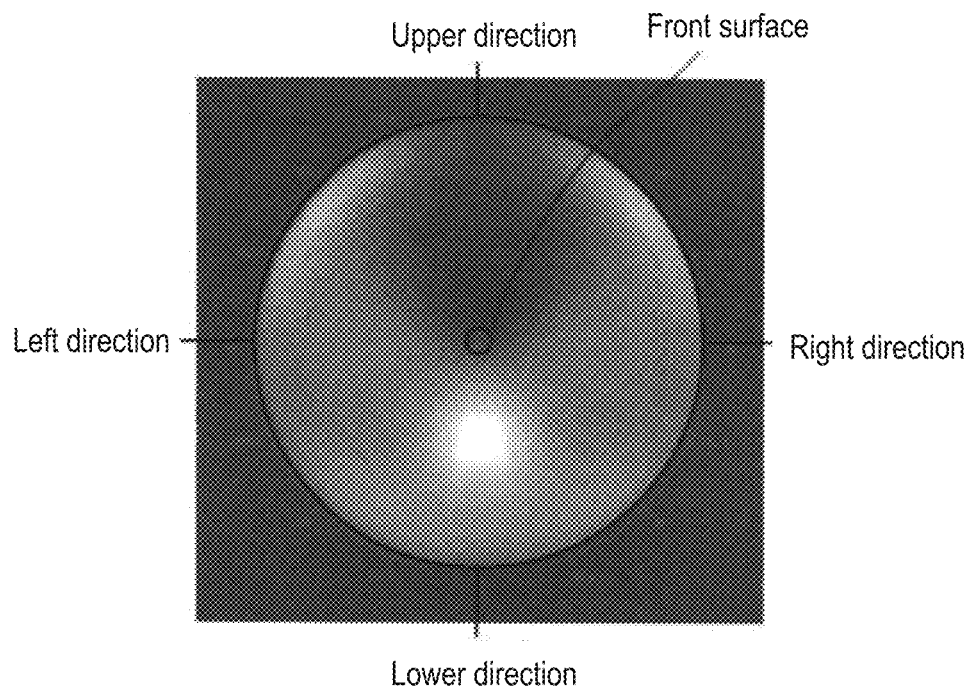
FIG. 8A is a diagram illustrating distribution characteristics of spatial distribution direction control in the surface light source lighting device of Embodiment 1 of the present disclosure.

FIG. 8A illustrates distribution characteristics of spatial distribution direction control in the surface light source lighting device of Embodiment 1.

FIG. 8A illustrates a distribution of light intensity in a hemispherical direction centering on the front direction. An upper side of the circle indicates a directly upper side, a lower side of the circle indicates a directly lower side, and this is also the same for the right and the left. Here, a white portion indicates a location where light is strongly emitted, and a black portion indicates a location where light is not emitted. Luminance is controlled further toward the lower side than the center, and thus it can be confirmed that a sufficient amount of light is secured by collecting light at this location. This is suitable for an instrument panel backlight of an on-vehicle speedometer or the like.

As mentioned above, according to the surface light source lighting device of Embodiment 1, a size of the surface light source lighting device is reduced by sufficiently diffusing light with short light incidence lens 6, then converting the light into substantially parallel light, and removing unnecessary light with louver 7, and, in this state, a direction of light can be controlled.

In a vehicular application, vibration is problematic, and there is the easy occurrence of long-term changes due to repetitive vibration, such as a relative positional deviation between LEDs 8 and light incidence lens 6, and a relative positional deviation between light incidence lens 6 and light guide plate 1, so that a direction of light tends to be deviated from an initial state due to the influence thereof. Even under such a condition, since louver 7 is used in the surface light source lighting device of Embodiment 1, it is possible to prevent unnecessary light from being obliquely emitted when deviating, and thus emission characteristics do not greatly vary. Therefore, since the safety is required in a vehicular application, stable lighting is obtained so that unnecessary light does not enter a visual field of a driver even in long-term use.

Regarding a temperature change, since an on-vehicle display is required to be used in a temperature range wider than in a temperature range of a typical consumer product, a relative positional deviation occurs in the order of 100 μm due to different expansion coefficients of materials when thermal expansion occurs. However, also in this case, a relative positional deviation between LEDs 8 and light incidence lens 6, and a relative positional deviation between light incidence lens 6 and light guide plate 1 easily occur, so that a direction of light tends to be deviated from an initial state due to the influence thereof. Also in this case, it is possible to achieve an effect of not causing unnecessary light as described above.

There is a case where the light guide plate is extended due to thermal expansion and is thus bent or curved. As a result, the prism angle of the light guide pattern changes. However, in the surface light source lighting device of Embodiment 1, since first light guide patterns 4A and second light guide patterns 4B are formed in oblique directions, the extent of the angle changing is lower than in the related art, and the influence of errors is a half of the related art. Thus, it is possible to realize favorable characteristics in which defects such as a variation in emission characteristics or a reduction in brightness of the surface light source lighting device scarcely occur.

As mentioned above, by using the surface light source lighting device of the present embodiment in a backlight of an on-vehicle display or the like, a size thereof is not greatly increased, and high likelihood is obtained for a positional deviation occurring due to vibration or a great temperature change in a severe vehicular environment. Therefore, it is possible to implement a surface light source lighting device which can maintain high reliability without deterioration from an initial state, and can set a direction control of emitted light to a desired direction.

Embodiment 2

In FIG. 8A as a result of Embodiment 1, it can be seen that the obliquely upper left and the obliquely upper right are slightly white, and thus light leakage occurs. The light in these directions is not included in a visual field, but may become a noise component as stray light. In Embodiment 2, an embodiment for improving this will be described.

Embodiment 1 corresponds to a case where first light guide pattern 4A is set to $\phi 1$ of 45°, second light guide pattern 4B is set to $\phi 2=180°-45°=135°$ since an inclined direction is different from that of first light guide pattern 4A, and an inclined angle is the same as that of first light guide pattern 4A, and $\theta A=32°$, $\theta A2=72°$, $\theta B1=32°$, and $\theta B2=72°$ are set. However, in Embodiment 2, $\phi 1=30°$ and $\phi 2=180°-30°=150°$ are set, and $\theta A1=40°$, $\theta A2=72°$, $\theta B1=40°$, and $\theta B2=72°$ are set. Remaining configurations are the same as those in Embodiment 1.

Figure 8B:
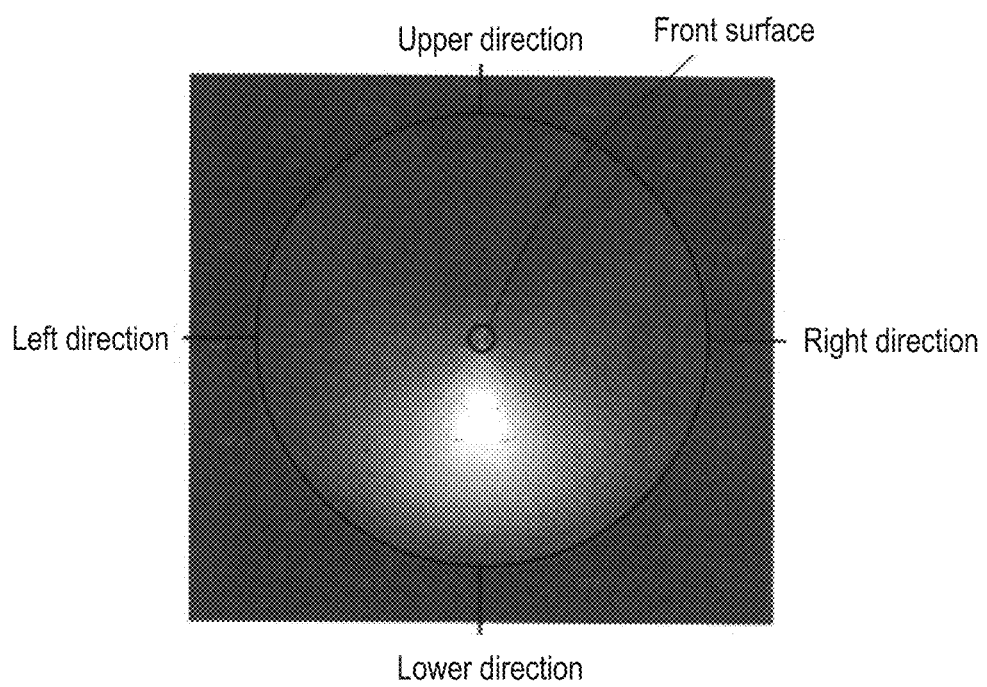
FIG. 8B is a diagram illustrating distribution characteristics of spatial distribution direction control in a surface light source lighting device of Embodiment 2 of the present disclosure.

FIG. 8B illustrates distribution characteristics of spatial distribution direction control as a result thereof. In the above-described way, in Embodiment 2, it can be seen that unnecessary light in the oblique directions, generated in Embodiment 1, is removed, and a direction of light is controlled from the center in the lower direction.

Embodiment 3

There is a case where light is desired to be collected at the center more than in the case illustrated in FIG. 8B as a result of Embodiment 2 depending on conditions for providing the surface light source lighting device. In Embodiment 2, $\theta A1=40°$, $\theta A2=72°$, $\theta B1=40°$, and $\theta B2=72°$ are set, but, in Embodiment 3, $\theta A1=44°$, $\theta A2=72°$, $\theta B1=44°$, and $\theta B2=72°$ are set. Remaining configurations are the same as those in Embodiment 2.

Figure 8C:
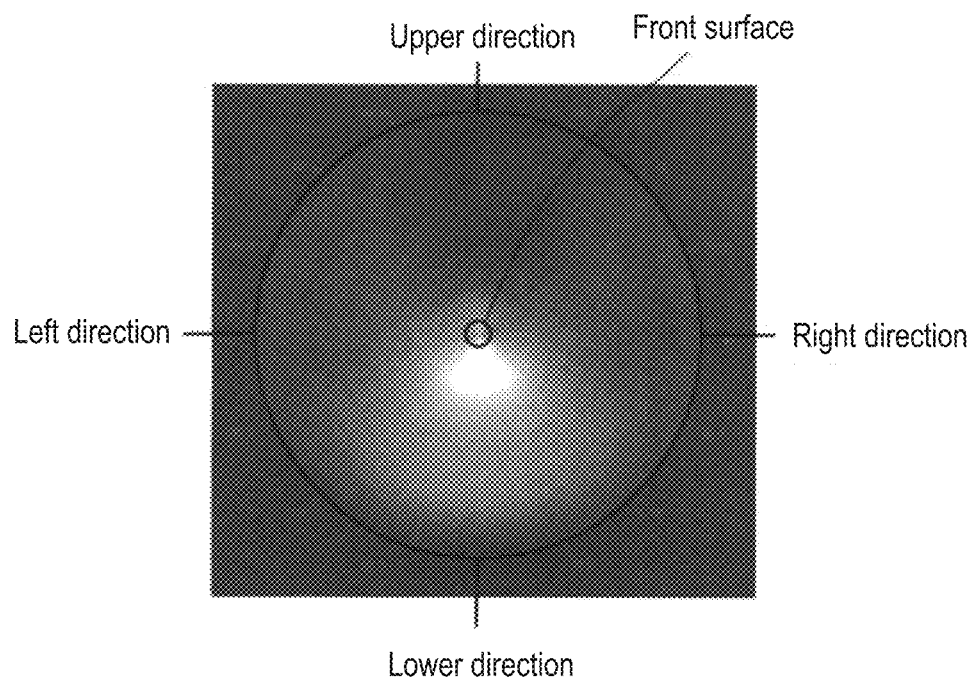
FIG. 8C is a diagram illustrating distribution characteristics of spatial distribution direction control in a surface light source lighting device of Embodiment 3 of the present disclosure.

FIG. 8C illustrates distribution characteristics of spatial distribution direction control as a result thereof. In the above-described way, in Embodiment 3, unnecessary light in the oblique directions is removed, and a direction of light is controlled in the lower direction close to the center. As mentioned above, it can be seen that it is also possible to flexibly cope with design demands for display arrangements which are different from each other for respective vehicle models.

Embodiment 4

A description has been made of an example in which light is not emitted from the front surface of light guide plate 1 in the upper direction, and a direction of emitted light is controlled from the front surface of light guide plate 1 in the lower direction in Embodiment 1 and Embodiment 2. However, in a case of a central panel device such as an on-vehicle navigation device, light is not emitted toward a front window side located on the upper front side of light guide plate 1 in the same manner, but it is required for light to be strongly emitted toward a driver seat side and a passenger seat side, and thus luminance in the front direction of light guide plate 1 is not greatly necessary. In Embodiment 4, a description will be made of a form capable of satisfying this specification.

In Embodiment 4, $\phi 1=45°$ and $\phi 2=180°-45°=135°$ are set in the same manner as in Embodiment 1, but there is a difference from Embodiment 1 in terms of a configuration of rear surface sheet 5. A light absorbing material is used for rear surface sheet 5 of Embodiment 1, but, in Embodiment 4, a light reflection material is used for rear surface sheet 5 in order to positively use light leaking to the rear surface of light guide plate 1. Remaining configurations are the same as those in Embodiment 1.

Figure 8D:
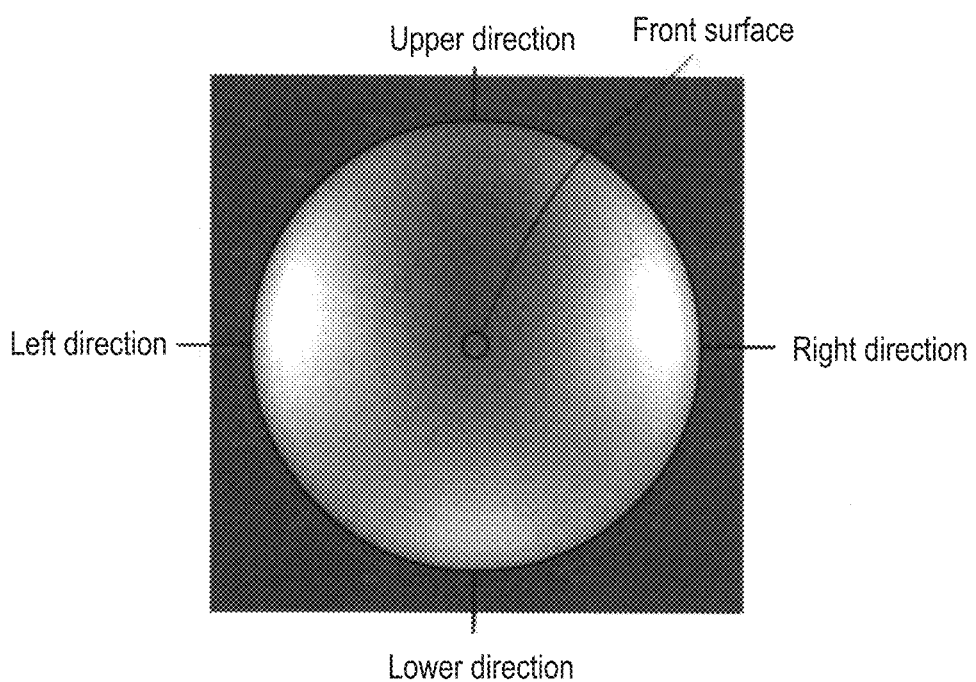
FIG. 8D is a diagram illustrating distribution characteristics of spatial distribution direction control in a surface light source lighting device of Embodiment 4 of the present disclosure.

Consequently, light leaking to the rear surface of light guide plate 1 is regularly reflected toward the front surface side of light guide plate 1 by rear surface sheet 5. Therefore, it can be seen that distribution characteristics of spatial distribution direction control show that, as illustrated in FIG. 8D, a driver seat side and a passenger seat side in a horizontal direction are bright, and a direction of light is controlled so that unnecessary light toward a front window side is removed.

Embodiment 5

In Embodiment 4, a description has been made of an example in which, in a case of a central panel device, it is required for light to be strongly emitted toward a driver seat side and a passenger seat side corresponding to the left and right of light guide plate 1. However, in a display room mirror for rear side checking, a required direction is the same, but a light source element is necessarily provided on the upper lateral side of light guide plate 1 due to an installation restriction. In Embodiment 5, a description will be made of a form capable of satisfying this specification.

Figure 10:
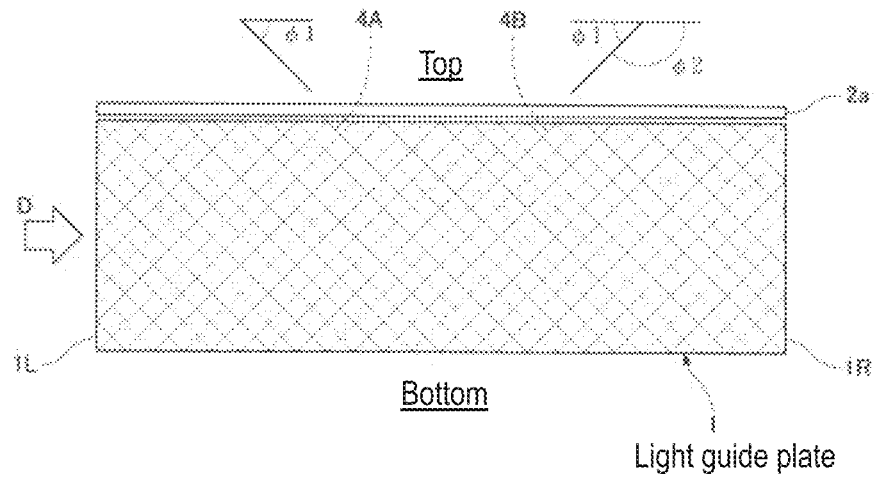
FIG. 10 is a front view of a surface light source lighting device according to Embodiment 5 of the present disclosure.

In Embodiment 5, as illustrated in FIG. 10, light incidence portion 3a and light incidence portion 3b are not necessary, and light source 2a is provided over the upper lateral side of light guide plate 1.

First light guide pattern 4A and second light guide pattern 4B are preferably respectively set to $\phi 1=28°$ and $\phi 2=180°-28°=152°$, and, at 0.45 or more as a refractive index difference between a material forming the light guide plate and air, base angle $\theta A1$ of first principal prism reflection surface 17 of first light guide pattern 4A is formed to be at least 45° to at most 65°, base angle $\theta A2$ of first subsidiary prism reflection surface 18 is formed to be at least 70° to at most 90°, base angle $\theta B1$ of second principal prism reflection surface 19 of second light guide pattern 4B is formed to be at least 45° to at most 65°, and base angle $\theta B2$ of second subsidiary prism reflection surface 20 is formed to be at least 70° to at most 90°. More specifically, preferably, base angles $\theta A1$, $\theta A2$, $\theta B1$ and $\theta B2$ of reflection surfaces of the light guide patterns are respectively 54°, 76°, 54°, and 76°.

Figure 11:
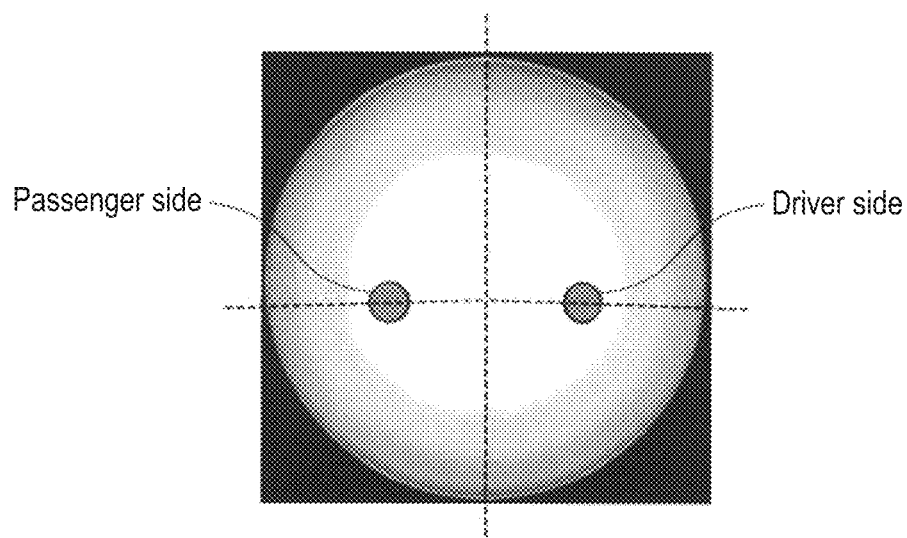
FIG. 11 is a diagram illustrating distribution characteristics of spatial distribution direction control in the surface light source lighting device of Embodiment 5 of the present disclosure.

Consequently, it can be seen that distribution characteristics of spatial distribution direction control show that, as illustrated in FIG. 11, a direction of light is controlled so that a driver side and a passenger side in a horizontal direction are bright.

Figure 12A:
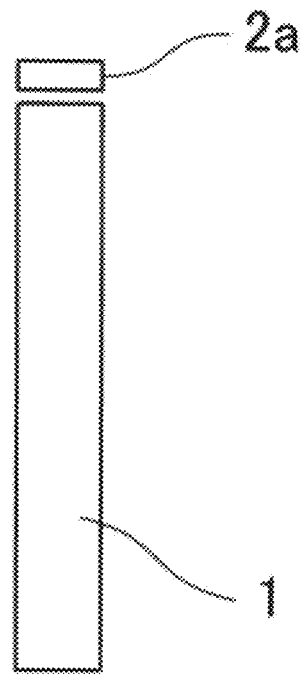
FIG. 12A is a view in which the surface light source lighting device of Embodiment 5 of the present disclosure is viewed from a direction of an arrow D illustrated in FIG. 10.
Figure 12B:
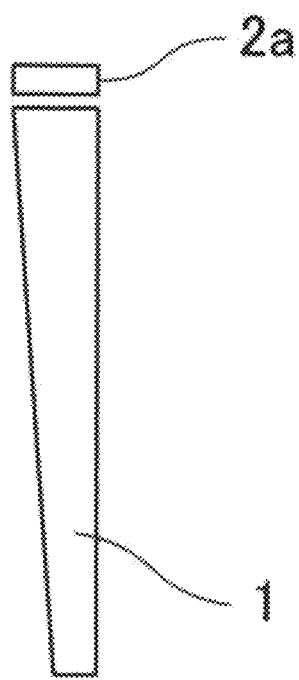
FIG. 12B is a view in which the surface light source lighting device of Embodiment 5 of the present disclosure is viewed from a direction of an arrow D illustrated in FIG. 10 in another specific example thereof.

In the surface light source lighting device of Embodiment 5 of the present disclosure, light guide plate 1 illustrated in FIG. 10 has a rectangular sectional shape when viewed from an arrow D direction as illustrated in FIG. 12A. Light guide plate 1 illustrated in FIG. 10 may have a wedge sectional shape when viewed from the arrow D direction as illustrated in FIG. 12B.

INDUSTRIAL APPLICABILITY

The present invention can be easily set in specifications requiring emission characteristics of the surface light source lighting device used for a backlight or the like of a display, and thus contributes to realization of stable display and improvement of reliability of various electronic apparatuses requiring a surface light source lighting device.

The invention claimed is:

1. A surface light source lighting device in which light is incident to an edge surface of a light guide plate from a light source so as to propagate through the light guide plate, and the light is emitted from a front surface of the front surface and a rear surface of the light guide plate, the device comprising:

a light source including a plurality of light source elements which are disposed with an interval in a longitudinal direction of the edge surface of the light guide plate;
a first light guide pattern having a linear groove group in a first oblique direction with respect to a light incidence direction from the light source on the rear surface of the light guide plate to which light is incident from the light source;
a second light guide pattern having a linear groove group in a second oblique direction which is different from the first oblique direction of the first light guide pattern on the rear surface of the light guide plate; and
a light incidence portion including a light incidence lens which converts linear light incident from the light source into substantially parallel light; and a louver which absorbs light deviated from the parallel light in light having passed the light incidence lens and through which the light passes,
wherein light reflected by the first light guide pattern is reflected by the second light guide pattern, and is emitted from the front surface of the light guide plate, and
light having passed through the light incidence portion is incident to the edge surface of the light guide plate.

2. The surface light source lighting device of claim 1, wherein the light incidence lens has curved surfaces on a side of the light source and on a side of the louver, and a length of the light incidence lens is smaller than a distance of a pitch of the light source elements of the light source.

3. The surface light source lighting device of claim 1, wherein the louver includes:
partition walls that are disposed with an interval in the longitudinal direction of the edge surface of the light guide plate and blocks incident light;
a reflection surface that reflects light which is spread toward a front surface side or a rear surface side of the light guide plate from between the partition walls; and
an air layer or a resin layer that is formed in a region surrounded by the partition walls and the reflection surface.

4. The surface light source lighting device of claim 3, wherein an interval between the partition walls is in a range from 0.1 times to 0.6 times inclusive a depth of the partition walls.

5. The surface light source lighting device of claim 1, wherein the first light guide pattern is formed of a first principal prism reflection surface, and a first subsidiary prism reflection surface having a larger inclined base angle than an inclined base angle of the first principal prism reflection surface,
wherein the second light guide pattern is formed of a second principal prism reflection surface, and a second subsidiary prism reflection surface having a larger inclined base angle than an inclined base angle of the second principal prism reflection surface, and
wherein light reflected by the first subsidiary prism reflection surface is further reflected by the second principal prism reflection surface, and is emitted from the front surface of the light guide plate.

6. The surface light source lighting device of claim 5, wherein, at 0.45 or more as a refractive index difference between a material forming the light guide plate and air, a base angle of the first principal prism reflection surface of the first light guide pattern is at least 30° to at most 50°, and a base angle of the first subsidiary prism reflection surface is at least 70° to at most 90°, and a base angle of the second principal prism reflection surface of the second light guide pattern is at least 30° to at most 50°, and a base angle of the second subsidiary prism reflection surface is at least 70° to at most 90°.

7. The surface light source lighting device of claim 5, wherein, at 0.45 or more as a refractive index difference between a material forming the light guide plate and air, a base angle of the first principal prism reflection surface of the first light guide pattern is at least 45° to at most 65°, and a base angle of the first subsidiary prism reflection surface is at least 70° to at most 90°, and a base angle of the second principal prism reflection surface of the second light guide pattern is at least 45° to at most 65°, and a base angle of the second subsidiary prism reflection surface is at least 70° to at most 90°.

* * * * *